United States Patent [19]

Kunitomo

[11] Patent Number: 5,351,283
[45] Date of Patent: Sep. 27, 1994

[54] VEHICLE-MOUNTED CHARGING APPARATUS FOR PORTABLE TELEPHONE SETS

[75] Inventor: Kouichi Kunitomo, Yokohama, Japan

[73] Assignee: Matsushita Electric Industrial Co., Ltd., Kadoma, Japan

[21] Appl. No.: 986,745

[22] Filed: Dec. 8, 1992

[30] Foreign Application Priority Data

Dec. 9, 1991 [JP] Japan .................. 3-324434

[51] Int. Cl.⁵ .......................................... H04M 11/00
[52] U.S. Cl. ......................................... 379/58; 379/63
[58] Field of Search ................. 379/442, 58, 59, 63, 379/429; 455/38.3, 89, 90; 320/35, 36; 307/60, 61, 64, 66, 38, 21, 116, 117, 130

[56] References Cited

U.S. PATENT DOCUMENTS

| | | | |
|---|---|---|---|
| 4,229,687 | 10/1980 | Newman | 320/35 |
| 4,667,143 | 5/1987 | Cooper et al. | 320/35 |
| 4,965,507 | 10/1990 | Smilanich et al. | |
| 5,214,311 | 5/1993 | Kageyama et al. | 307/64 |

FOREIGN PATENT DOCUMENTS

| | | |
|---|---|---|
| 0479249A2 | 10/1991 | European Pat. Off. |
| 0494780A2 | 1/1992 | European Pat. Off. |
| 3-7025 | 1/1991 | Japan |
| WO09108604 | 6/1991 | World Int. Prop. O. ... 320/35 |
| WO92/09130 | 5/1992 | World Int. Prop. O. |

*Primary Examiner*—James L. Dwyer
*Assistant Examiner*—Jack Chiang
*Attorney, Agent, or Firm*—Mason, Fenwick & Lawrence

[57] ABSTRACT

In a vehicle-mounted charging apparatus for a portable telephone set comprising a portable telephone set and a vehicle-mounted charger in combination, a constant voltage charging control microcomputer in the charger receives information on a voltage of a battery pack and information on the on/off state of power supply to the telephone set and performs charging control so that rapid charging is performed within an appropriate charging temperature range, while trickle charging is performed outside the appropriate charging temperature range, on the basis of information on the temperatures in the battery pack detected by a temperature sensor 15 provided in the battery pack. When trickle charging should be performed, a charging-special microcomputer is switched to a trickle charging mode. In this state, when the telephone set is supplied with power from the battery pack and the voltage of the battery pack is low, a constant voltage source in the charger is operated to supply power to the telephone set. When the charging-special microcomputer is switched to the rapid charging mode, the operation of the constant voltage source is stopped. Thus, the vehicle-mounted charging apparatus for a portable telephone set constructed as above is adapted to any condition of use in a vehicle-mounted state.

3 Claims, 2 Drawing Sheets

VEHICLE-MOUNTED CHARGING APPARATUS FOR PORTABLE TELEPHONE SETS

BACKGROUND OF THE INVENTION

The present invention relates to a vehicle-mounted charging apparatus for portable telephone sets used as a public communication device.

FIG. 2 shows the structure of a conventional vehicle-mounted charging apparatus for a portable telephone set. In FIG. 2, reference numeral 21 denotes a portable telephone set to which a battery pack 22 containing a battery 22a is made connectable. Reference numeral 23 denotes a power source switch which is switched on/off by an internal circuit 24. Reference numeral 25 denotes a temperature sensor such as a thermistor which transmits information on sensed temperatures in the battery pack 22 through an external connector 26 and a connection cable 27, which has connectors 27a and 27b attached to its respective ends, to a vehicle-mounted charger 28 through an external connector 211 thereof.

Reference numeral 29 denotes a constant current drive transistor provided in the charger 28 and having an emitter impressed with a voltage Vcc from a vehicle-mounted battery (not shown) and a collector from which a charging current is supplied through a reverse current preventing diode 30 to the battery 22a in the battery pack 22. Reference numeral 210 denotes a constant current control microcomputer which supplies a signal to the base of the transistor 29 to control the operation of the transistor 29. Reference numeral 211 denotes an external connector provided in the charger 28 for connection to the connector 27b of the connection cable 27. Thus, the charging apparatus 28 is composed of the transistor 29, diode 30, microcomputer 210 and external connector 211.

The operation of the conventional apparatus will next be described. In FIG. 2, the battery pack 22 is connected to the portable telephone set 21. The connectors 27a and 27b are connected to the external connectors 26 and 211, respectively, to connect the battery pack 22 and the charger 28 with each other. Then, the voltage Vcc is applied from the vehicle-mounted battery to the emitter of transistor 29 to thereby start charging of the battery 22a in the battery pack 22 through the collector of the transistor 29, diode 30, connectors 211 and 27b, connection cable 27, and connectors 27a and 26. In this case, since floating charging is performed, charging of the battery 22a continues regardless of whether the power source switch 23 of the portable telephone set 21 is switched on or off. Then, the microcomputer 210 monitors the state of the charging output terminal of the transistor 29, detects an error voltage $-\Delta V$ with respect to the rated constant voltage appearing close to the time of completion of charging of a Ni—Cd or nickel—hydrogen battery to thereby terminate the floating charging and shifts to trickle charging.

In order to protect the battery, the temperature sensor 25 is provided to monitor the ambient temperature and the heat generated by the battery. At a temperature outside an appropriate charging temperature range, the microcomputer 210 is set to control the charging of the battery to be shifted to trickle charging.

In this way, in the conventional charging apparatus, floating charging in the portable telephone set is possible so far as it is performed within an appropriate charging temperature range.

However, in the conventional charging apparatus, a charging temperature range, within which rapid charging is possible, is fixed. Therefore, even when a charging current equivalent to a rapid charging current is made to flow outside the fixed charging temperature range at the time of communication of the portable telephone set, the charging apparatus operates to supply only a trickle current. As a result, the remaining current is discharged from the battery pack 22. Thus, when the battery pack 22 has become substantially empty, the portable telephone set 21 cannot be put to use.

SUMMARY OF THE INVENTION

The present invention solves such a problem of the conventional charging apparatus. It is an object of the present invention to provide a vehicle-mounted charging apparatus for a portable telephone set which can perform charging control in response to the operating state of the portable telephone set, the ambient condition under which the portable telephone set is used, the remaining capacity of the battery in the battery pack, and the condition of the battery which requires rapid charging thereof.

In order to attain the above object, in the apparatus of the present invention, a portable telephone set comprises an analogue/digital converter for monitoring an output voltage of a battery pack, an internal circuit for providing information on the state of the portable telephone set to the vehicle-mounted charger, and a temperature sensor for sensing the temperature of the battery pack. A vehicle-mounted charger comprises a charge-special microcomputer for determining the charging condition on the basis of the information from the temperature sensor to control the charging of the battery pack, and a constant voltage charging control microcomputer for controlling an operation of a constant voltage power source on the basis of the information from the internal circuit and the control of the charge-special microcomputer.

An output voltage from the battery pack depending on the operating state of the telephone set is inputted to the analog/digital converter, where this inputted voltage is converted to a digital signal, which digital signal is then supplied to the internal circuit. The internal circuit delivers data representing the state of the portable telephone set to the constant voltage charging control microcomputer in the vehicle-mounted charger. The constant voltage charging control microcomputer controls the operation of the constant voltage power source to thereby control a voltage of the telephone set at a predetermined voltage. The charge-special microcomputer controls a charging current to the battery pack and the operation of the constant voltage charging control microcomputer in accordance with an output signal from the temperature sensor, whereby the constant voltage charging control microcomputer controls the operation of the constant voltage power source and thereby controls the power supply voltage of the telephone set at a predetermined voltage. As a result, the charging apparatus of the present invention can control charging of the battery in accordance with the operating state of the telephone set and the charging condition.

Therefore, according to the present invention, the constant voltage charging control microcomputer in the charger grasps the operating states of the charge-special microcomputer and the operating states of the telephone set and the battery pack to thereby cause the constant voltage power source to operate. Thus, even in a temperature range where rapid charging is not possible, the portable telephone set can be used satisfactorily in the vehicle-mounted state.

DESCRIPTION OF THE PREFERRED EMBODIMENT

Figure 1:
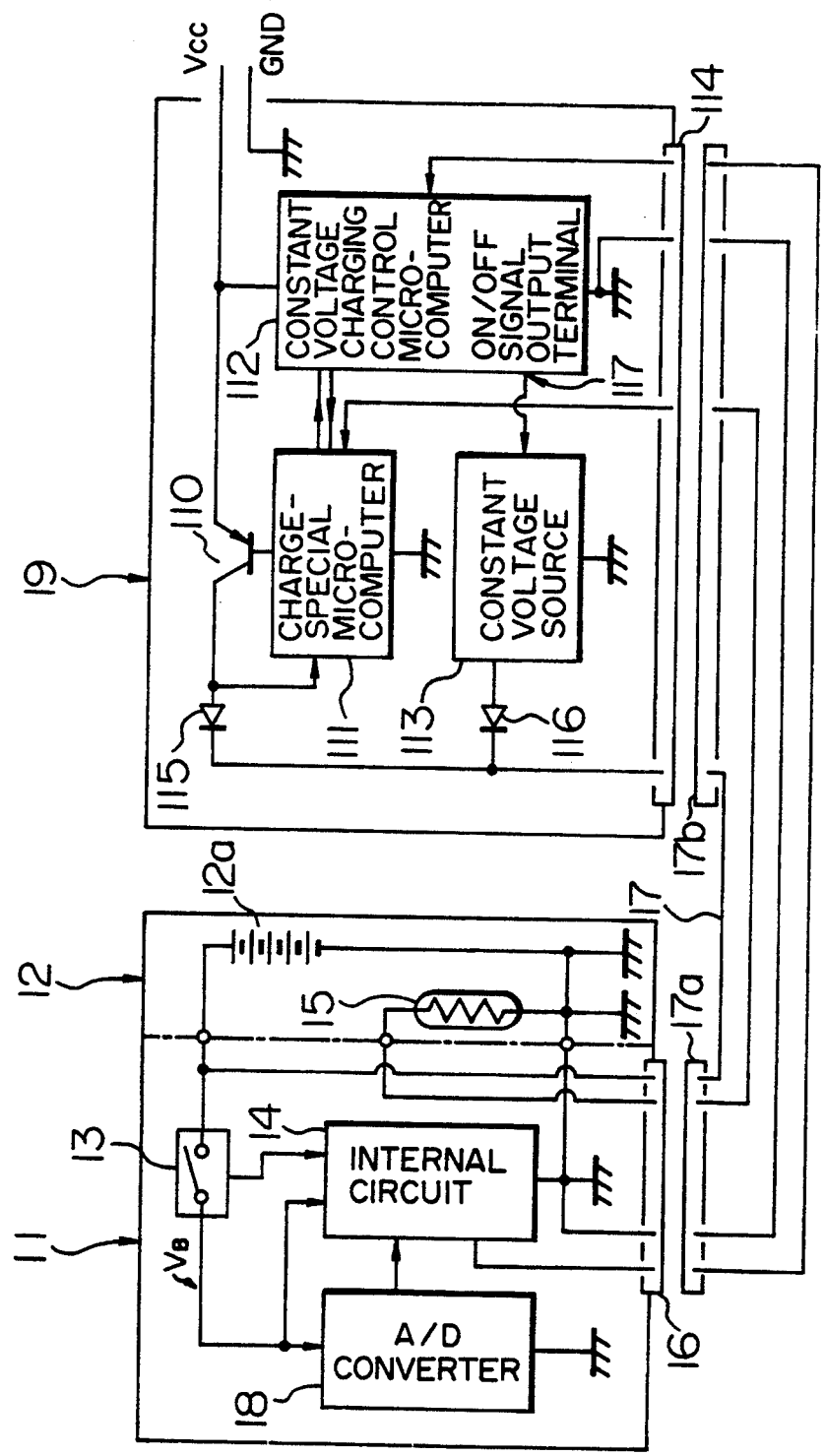
FIG. 1 is a schematic block diagram of a vehicle-mounted charging apparatus for a portable telephone set of a first embodiment of the present invention.
Figure 2:
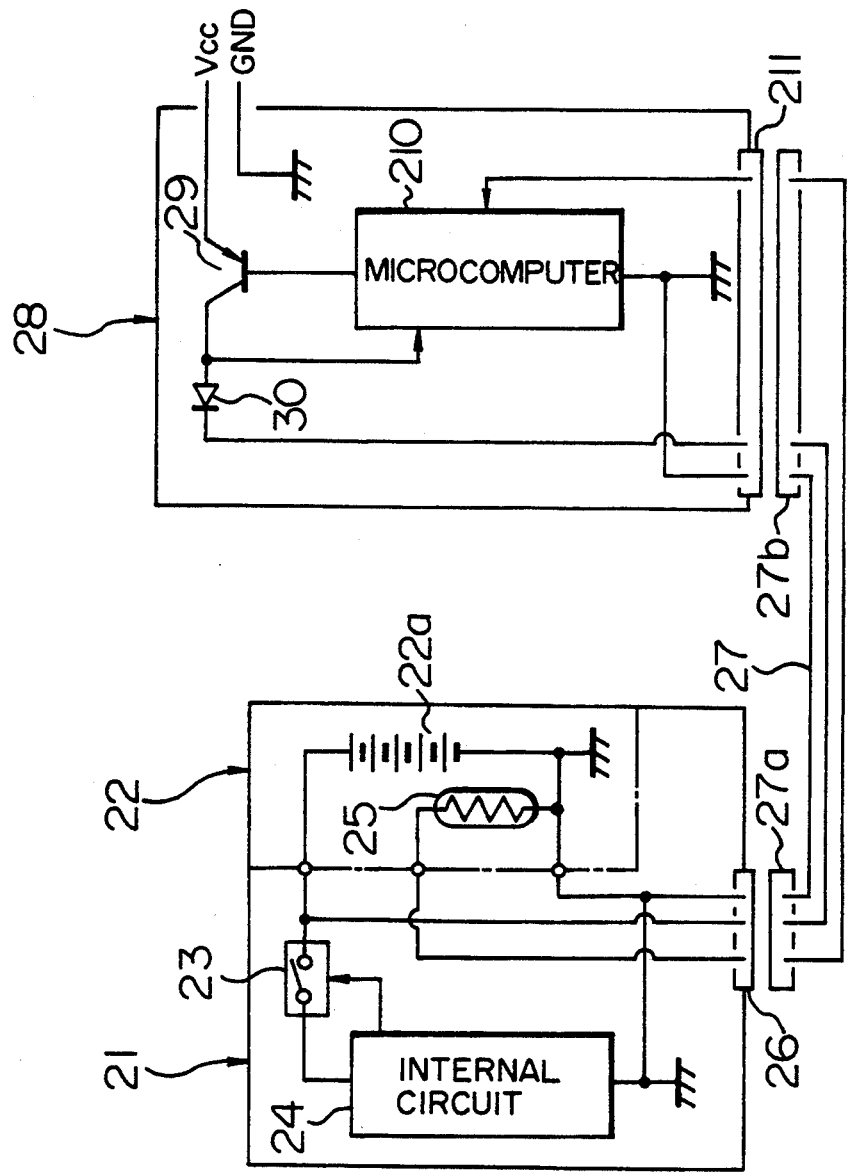
FIG. 2 is a schematic block diagram of a conventional vehicle-mounted charging apparatus.

FIG. 1 shows the structure of a first embodiment of the present invention. In FIG. 1, reference numeral 11 denotes a portable telephone set to which a battery pack 12 containing a battery 12a is adapted to be connected. Reference numeral 15 denotes a temperature sensor composed of a thermistor or the like which senses temperatures within the battery pack 12 and supplies a sensing output to a charge-special microcomputer 111 through an external connector 16, connectors 17a and 17b connected at respective ends of a connection cable 17, and external connector 114 of the vehicle mounted charger 19.

Reference numeral 13 denotes a power source switch provided in the telephone set 11 and which switches on/off to apply/cut off a voltage from the battery pack 12 to an analog/digital converter 18 (hereinafter abbreviated as an A/D converter), respectively. The A/D converter 18 converts a voltage from the battery 12a in the battery pack 12 to a digital signal.

Reference numeral 14 denotes an internal circuit which receives a digital signal from the A/D converter 18, controls switching on/off of the power source switch 13, and transmits information on the operating state of the telephone set 11 from the external connector 16 through the connector 17a, connection cable 17, connector 17b, and an external connector 114 of the charger 19 to a constant voltage charging control microcomputer 112 in accordance with an output from the A/D converter 18, that is, a voltage of the battery 12a which may vary depending on the operating state of the telephone set 11.

The external connector 16 is attached to the portable telephone set 11. Thus, the telephone set 11 is composed of the power source switch 13, A/D converter 18, internal circuit 14 and external connector 16.

Reference numeral 110 denotes a constant current drive transistor contained in the charger 19. The transistor 110 has an emitter supplied with a voltage Vcc from a vehicle-mounted battery (not shown), a collector connected through a reverse current preventing diode 115 to the external connector 114, and a base connected to an output terminal of the charge-special microcomputer 111, and it supplies a charging current to the battery pack 12.

The charge-special microcomputer 111 receives information from the temperature sensor 15 and supplies it to the base of the transistor 110 and also to the constant voltage charging control microcomputer 112. The microcomputer 112 receives an output from the internal circuit 14 and an output from the charge-special microcomputer 111 and controls the operation of the transistor 110, and further controls the operation of a constant voltage source 113, which is used as an emergency power source, by using an on/off control signal outputted from the ON/OFF signal output terminal 117. An output from the constant voltage source 113 is connected through a diode 116 to the external connector 114. Thus, the charger 19 is composed of the constant current drive transistor 110, charge-special microcomputer 111, constant voltage charging control microcomputer 112, constant voltage source 113, diodes 115 and 116, and external connector 114.

The operation of the first embodiment will be now described. When the power source switch 13 is switched on, the power source of the telephone set 11 is turned on. Thus, the voltage of the battery 12a is applied through the power source switch 13 to the A/D converter 18, where the voltage is converted to a digital signal. The value of the power source voltage represented by the digital signal and the information on the ON state of the power switch 13 is inputted to the internal circuit 14, which then transmits a digital signal through the external connector 16, connector 17a, connection cable 17, connector 17b, and the external connector 114 to the constant voltage charging control microcomputer 112 in the charger 19. The temperature in the battery pack 12 is monitored by the temperature sensor 15 and the information on the monitoring is delivered to the charge-special microcomputer 111.

If the temperature is within a temperature range appropriate for rapid charging, the charge-special microcomputer 111 designates a rapid charging mode to thereby drive the constant current drive transistor 110. At this time, the rapid charging on/off information is supplied to the constant voltage charging control microcomputer 112.

If the charging condition is not appropriate for rapid charging, the charge-special computer 111 is placed in a trickle charging mode based on the information from the temperature sensor 15. At this time, when the use of the telephone set 11 is desired, but the remaining capacity of the battery pack 12 is substantially zero, so that the battery voltage $V_B$ monitored by the A/D converter 18 drops and reaches a minimum voltage level $V_L$ necessary for the use of the telephone set 11, the constant voltage charging control microcomputer 112 drives the constant voltage source 113, whereby the telephone set 11 can be supplied with power from the constant voltage source 113.

In this state, if the ambient temperature changes to fall within the suitable charging temperature range, the charge-special microcomputer 111 is switched to the rapid charging mode. Then, the constant voltage charging control microcomputer 112 stops the operation of the constant voltage source 113 on the basis of this information. Also, when the telephone set 11 is in a power-off state, the computer 112 operates to stop the operation of the constant power source 113. Among the operations of the apparatus of the present invention, the logic of the start-up conditions of the constant voltage source 113 is shown in Table 1 below:

TABLE 1

|  | Charge-special microcomputer 111 is on | Charge-special microcomputer 111 is off |
| --- | --- | --- |
| $V_B \leq V_L$ (Power source switch 13 is on) | Constant voltage source 113 is off | Constant voltage source 113 is started |
| $V_B > V_L$ (Power | Constant voltage source 113 is off | Constant voltage source 113 is off |

TABLE 1-continued

| | Charge-special microcomputer 111 is on | Charge-special microcomputer 111 is off |
|---|---|---|
| source switch 13 is on) | | |

In Table 1, $V_B$ denotes an input voltage to the internal circuit 14 and the A/D converter 18, $V_L$ denotes an minimum necessary input voltage the internal circuit 14 and the A/D converter 18.

(When the power source switch 13 is off, the constant voltage source 113 is not started, that is, remains at a standstill).

As described above, according to the first embodiment of the present invention, the emergency constant voltage source 113 is operated, only when the remaining capacity of the battery 12 is reduced, outside the suitable operating temperature range of the charge-special microprocessor 111 which can provide a charging power source for the telephone set 11. Thus, in any cases, the portable telephone set 11 can be put to use in a vehicle-mounted state.

As will be apparent from the above description of the embodiment, the present invention contemplates to add an emergency power source to the floating charging apparatus for the portable telephone set. The constant voltage charging control microcomputer grasps the operating state of the portable telephone set, the remaining battery capacity of the battery pack, and the operating state of the charge-special microcomputer and turns on the emergency power source when required. Thus, in any cases, the portable telephone set can be put to use in a vehicle-mounted state advantageously.

I claim:

1. A vehicle-mounted charging apparatus for a portable telephone set comprising:

a portable telephone set and a vehicle-mounted charger in combination, said portable telephone set comprising:

a temperature sensor for sensing temperatures within a battery pack connectable to said telephone set, an analog/digital converter for converting a voltage of the battery pack to a digital signal, and an internal circuit for receiving an output from the analog/digital converter and information on the state of power supply from the battery pack to said telephone set and outputting a digital signal representing an operating state of said telephone set;

and said vehicle-mounted charger comprising:

a constant current drive transistor for supplying a charging current to the battery pack, a charge-special microcomputer for receiving a sensing output signal from the temperature sensor to control the constant current drive transistor in accordance with the operating state of said telephone set, a constant voltage source for providing an emergency power source to said telephone set, and a constant voltage charging control microcomputer for receiving the digital signal from the internal circuit and an output from the charge-special microcomputer to control operation of the constant voltage source to provide emergency power to said telephone set in response to said telephone set not receiving sufficient power from said battery pack when a switch for applying power to said portable telephone set is in the ON state.

2. A vehicle-mounted charging apparatus according to claim 1, wherein the charge-special microcomputer is constructed to control the operation of the constant current drive transistor by designating one of rapid charging mode and trickle charging mode in response to the sensing output signal from the temperature sensor.

3. A vehicle-mounted charging apparatus according to claim 2, wherein, while said portable telephone set is put to use, when the voltage of the battery pack indicated by the digital signal from the internal circuit has fallen to have a value equal to or lower than a predetermined minimum value, in a state of said vehicle-mounted charger operating in the trickle charging mode in accordance with the designation by the charge-special microcomputer, the constant voltage charging control microcomputer of said vehicle-mounted charger controls to actuate the constant voltage source.

* * * * *